(12) United States Patent
Gengler

(10) Patent No.: US 6,662,835 B1
(45) Date of Patent: Dec. 16, 2003

(54) ROTARY TREE CUTTER ATTACHMENT FOR TRACTOR

(76) Inventor: Melvin Gengler, R.R. 1, Beloit, KS (US) 67420-9801

( * ) Notice: Subject to any disclaimer, the term of this patent is extended or adjusted under 35 U.S.C. 154(b) by 0 days.

(21) Appl. No.: 10/153,551

(22) Filed: May 21, 2002

(51) Int. Cl.[7] .............................................. A01G 23/08
(52) U.S. Cl. ...................... 144/34.1; 37/302; 144/24.12
(58) Field of Search ................. 144/34.1, 4.1, 144/335, 336, 24.12; 56/229, 255, 13.6, 11.9, 6, 10.8; 37/302

(56) References Cited

U.S. PATENT DOCUMENTS

| | | | |
|---|---|---|---|
| 1,089,341 A | | 3/1914 | Jack, Jr. |
| 3,045,413 A | * | 7/1962 | Sheffer .......................... 56/11.9 |
| 3,115,739 A | * | 12/1963 | Thoen et al. ..................... 56/6 |
| 3,241,302 A | * | 3/1966 | Barry ........................... 56/13.6 |
| 4,573,306 A | * | 3/1986 | Smith et al. ................... 56/10.4 |
| 4,802,327 A | * | 2/1989 | Roberts ....................... 56/10.4 |
| 4,873,818 A | * | 10/1989 | Turner ........................ 56/10.8 |
| 4,946,488 A | * | 8/1990 | Davison ...................... 56/14.9 |
| 4,998,573 A | * | 3/1991 | York ........................... 144/235 |
| 5,101,873 A | | 4/1992 | Marshall |
| 5,123,462 A | * | 6/1992 | Davison ...................... 144/336 |
| 5,329,752 A | | 7/1994 | Milbourn |
| 5,479,971 A | | 1/1996 | Marshall |
| 5,503,201 A | | 4/1996 | Strickland et al. |
| 5,950,699 A | | 9/1999 | Dove |

* cited by examiner

Primary Examiner—Allen Ostrager
Assistant Examiner—Shelley Self
(74) Attorney, Agent, or Firm—Jeffrey L. Thompson; Thompson & Thompson, P.A.

(57) ABSTRACT

A rotary tree cutter attachment for a tractor includes a cutting assembly having a circular blade with a serrated outer edge, and a motor for rotatably driving the blade. A frame assembly for the tree cutter includes a first portion attached to the tractor frame, and a second portion extending perpendicular to the first portion and providing an offset mounting location outside a wheel path of the tractor. A pivot arm is pivotally connected to the offset mounting location for rotation about an axis transverse to the tractor's direction of travel. The pivot arm supports the cutting assembly and is movable about the transverse axis between a lowered position in which the cutting edge of the circular blade is generally horizontal and at ground level for cutting, and a raised position in which the cutting edge of the circular blade is elevated above ground level for traveling.

8 Claims, 3 Drawing Sheets

ROTARY TREE CUTTER ATTACHMENT FOR TRACTOR

BACKGROUND OF THE INVENTION

1. Field of the Invention

The present invention relates generally to devices for cutting trees. In particular, the present invention relates to an improved rotary tree cutting apparatus for mounting to a tractor or other mobile vehicle.

2. Description of the Related Art

Various devices for cutting trees are well known. For example, known attachments for front end loaders for brush and tree clearing include V-shaped blades with saw teeth, hydraulic clippers, reciprocating saw blades, rotating saw blades, and the like. These attachments are typically secured to the end of the loader arm or boom of the front end loader or to the front of a bull dozer type vehicle.

A number of V-shaped blades for attaching to mobile vehicles for clearing brush and trees are disclosed in prior patents. For example, U.S. Pat. No. 5,950,699 (Dove) discloses a V-shaped blade with saw teeth arranged to cut brush and trees during forward movement of the vehicle on which it is mounted.

Other types of attachments for tree and brush clearing are also disclosed in prior patents. For example, a tree shear having a pair of pincer-type cutting blades is shown in U.S. Pat. No. 5,503,201 (Strickland et al.). A tree cutting apparatus having a pair of opposing arcuate blades rotatably mounted on a frame is shown in U.S. Pat. No. 5,101,873 (Marshall). A tree cutting apparatus having a single arcuate blade mounted for rotating in two directions is disclosed in U.S. Pat. No. 5,479,971 (Marshall). A tree sawing machine having a reciprocating blade is disclosed in U.S. Pat. No. 1,089,341 (Jack, Jr.). A brush cutter work head having a circular blade 42 for attachment to a boom of a backhoe is disclosed in U.S. Pat. No. 5,329,752 (Milbourn).

The prior art devices described above are generally unsuitable for use on conventional tractors which are not equipped with front end loader boom arms, and are also generally unsuitable for use on small tractors to cut small trees. The operation of the prior art devices, particularly the V-shaped cutting blades, are often hard on the tires and other drive components of the vehicle on which they are mounted. The prior art devices also tend restrict visibility of the cutting blade by the operator during use.

Thus, there is a need in the industry for an improved rotary tree cutting device that can be mounted to a conventional tractor, and that will increase the efficiency of brush clearing and tree cutting operations.

SUMMARY OF THE INVENTION

It is an object of the present invention to provide a tractor-mounted rotary tree cutting device that solves the problems with the above-described conventional tree cutting devices.

It is a further object of the present invention to provide a rotary tree cutting device with a single blade which will cut trees efficiently with only minimal power requirements.

It is a further object of the present invention to provide an improved rotary tree cutting device which is simple in operation, economical to manufacture, lightweight for connection to small tractors and other mobile vehicles, and capable of a long operating life.

In order to solve the problems with the prior art described above, the applicant has developed an improved rotary tree cutting device for mounting to tractors and other mobile vehicles. The tree cutting device includes a cutting assembly having a circular blade with a serrated outer edge, and a motor for rotatably driving the blade. A frame assembly for the tree cutter includes a first portion attached to the tractor frame, and a second portion extending perpendicular to the first portion and providing an offset mounting location outside a wheel path of the tractor and slightly behind the front wheel. A pivot arm is pivotally connected to the offset mounting location for rotation about an axis transverse to the tractor's direction of travel. The pivot arm supports the cutting assembly and is movable about the transverse axis between a lowered position in which at least a portion of the cutting edge of the circular blade is at ground level for cutting, and a raised position in which the cutting edge of the circular blade is elevated above ground level for traveling. With the tree cutting device of the present invention, the cutting blade is highly visible by an operator of the tractor, and the tractor can continue its forward movement after each tree is cut without driving over the felled trees.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

Figure 1:
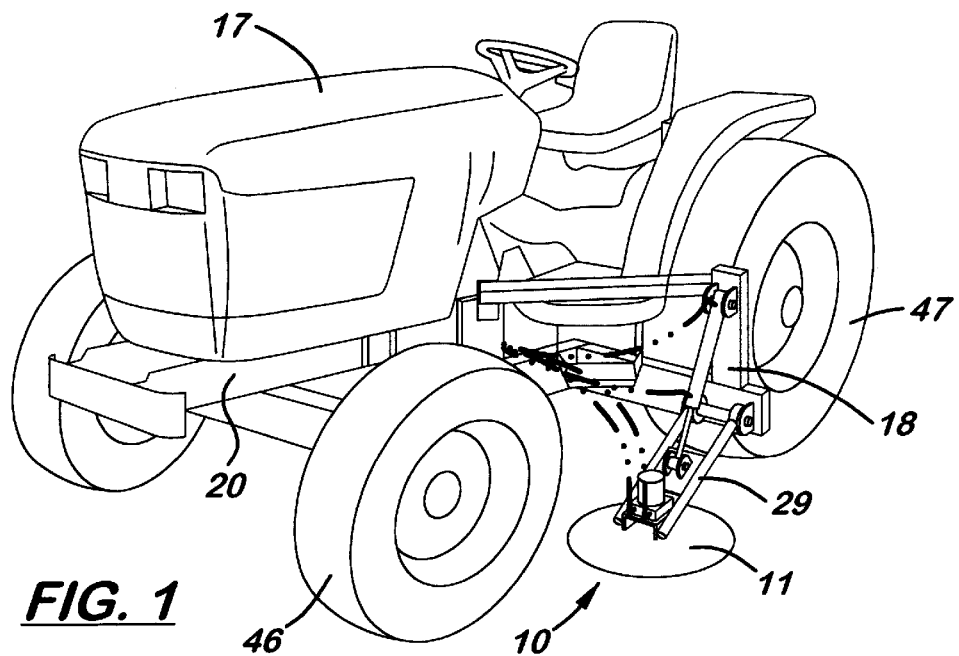
FIG. 1 is a perspective view of the rotary tree cutting device of the present invention mounted to a tractor.
Figure 2:
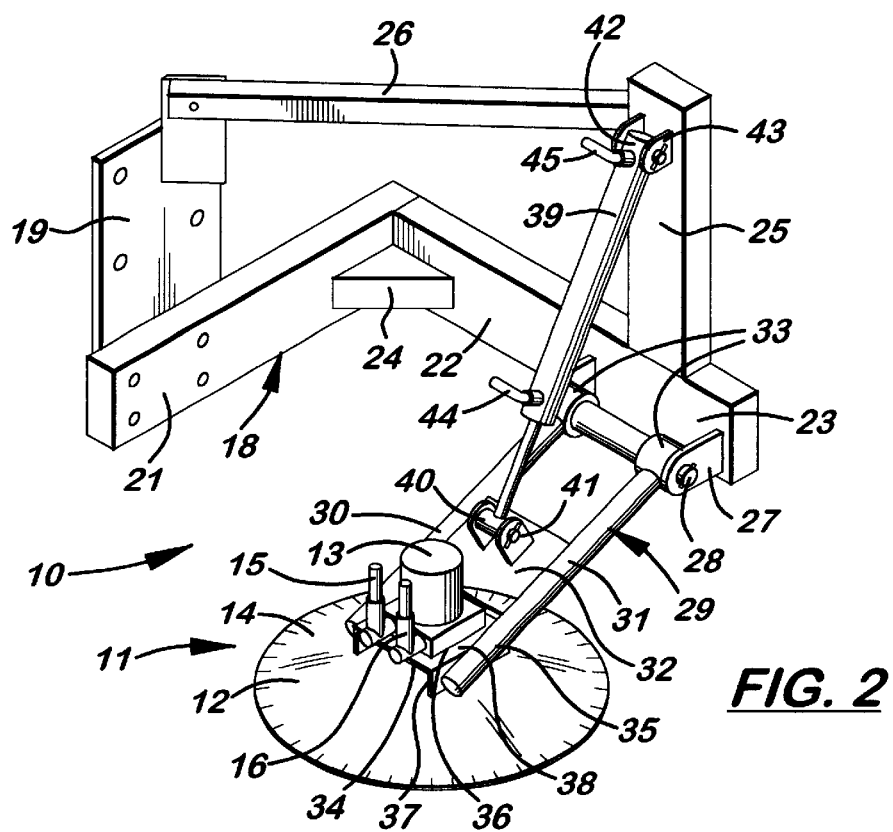
FIG. 2 is a perspective view of the rotary tree cutting device of the present invention.

A tractor-mounted rotary tree cutting device 10 according to a preferred embodiment of the present invention will now be described with reference to FIGS. 1 to 5 of the accompanying drawings.

The rotary tree cutter device 10 includes a cutting assembly 11 comprising a circular blade 12 connected to a hydraulic motor 13. The circular blade 12 has a concave side facing downwardly and a serrated outer edge 14 for cutting. The concave side facing downwardly accommodates a mounting structure between the motor 13 and the blade 12 to facilitate tree cutting at or below the ground surface. The circular blade 12 can be, for example, a modified disk blade from an earthworking implement. In this case, the disk blade is modified by making several shallow cuts in an outer periphery of the disk blade, and bending and/or grinding the cut portions to form the serrated outer edge 14 suitable for cutting. Alternatively, a conventional flat circular saw blade having a plurality of cutting teeth formed about its outer periphery can be used.

The hydraulic motor 13 is preferably an orbital motor having a supply line 15 and a return line 16 connected between the appropriate ports of the motor 13 and the hydraulic system of the tractor 17. The hydraulic motor 13 provides an efficient and powerful means for driving the circular blade 12 using the existing hydraulic power system available on the tractor 17.

Figure 3:
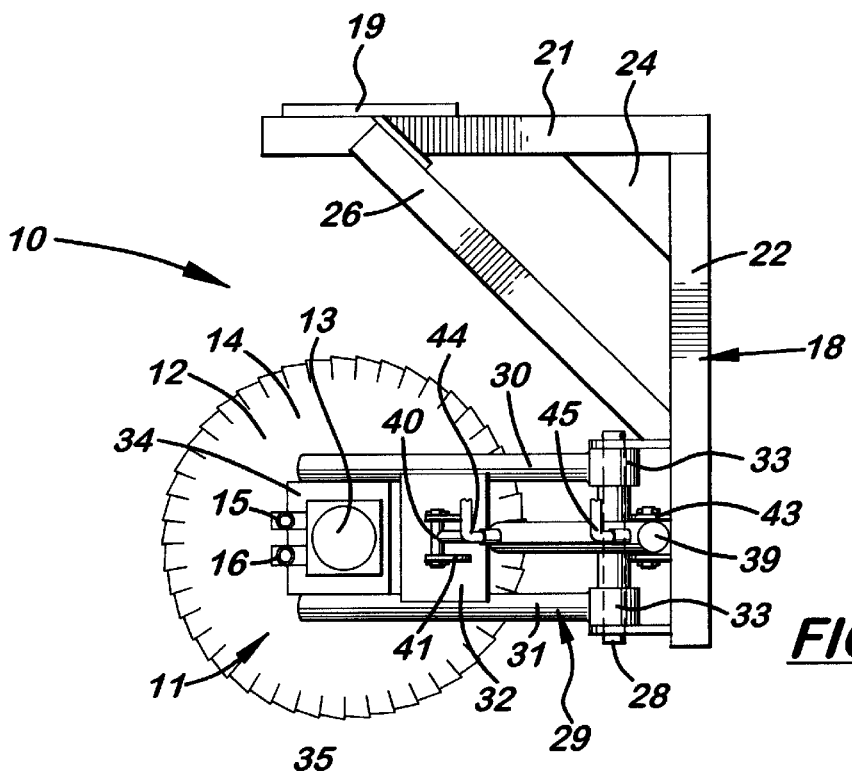
FIG. 3 is a plan view of the rotary tree cutting device of the present invention.
Figure 4:
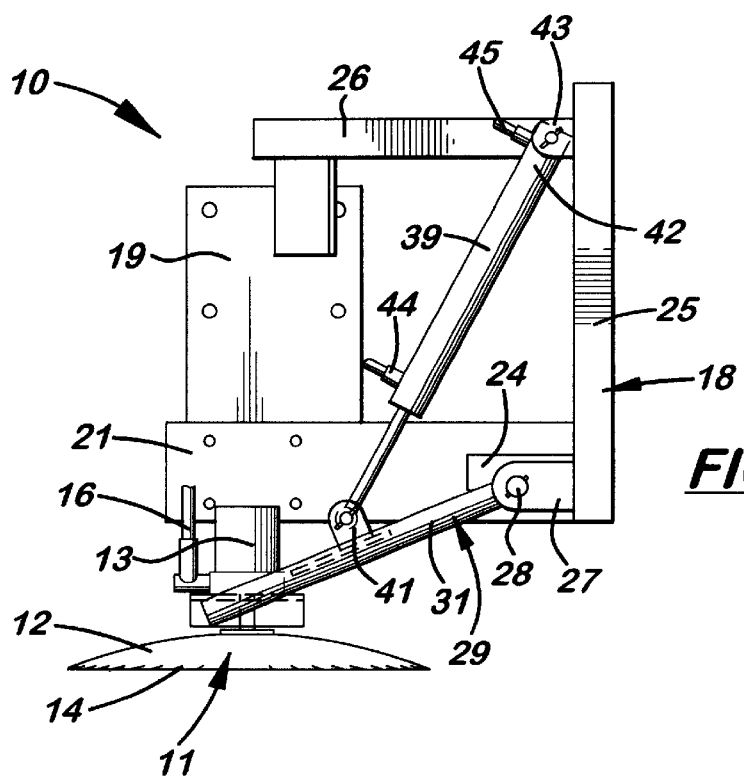
FIG. 4 is a side view of the rotary tree cutting device of the present invention.

The cutting assembly 11 is supported by a frame assembly 18 mounted to the tractor 17. The frame assembly 18 includes a first plate member 19 attached to the tractor frame 20 using threaded bolts or the like. The first plate member 19 extends downwardly from the tractor frame 20. A first tubular member 21 is attached to the first plate member 19 using threaded bolts or the like. The first tubular member 21 extends rearwardly from the first plate member 19. A second tubular member 22 is welded to the rear end of the first tubular member 21 and extends horizontally and perpendicularly to the first tubular member 21. The first and second tubular members 21, 22 together form an L-shape when viewed in plan view, as shown in FIG. 3. The second tubular member 22 provides an offset mounting location 23 outside of a wheel path of the tractor 17. A bracing member 24 is welded between the first and second tubular members 21, 22 to strengthen and stabilize the frame assembly 18.

A third tubular member 25 is connected to and extends upwardly from the second tubular member 22. A cross brace 26 extends between the first plate member 19 and the third tubular member 25 to further strengthen the frame assembly 18.

A pair of flanges 27 are welded to a front side of the second tubular member 22 and extend forwardly therefrom. A bore hole is provided through each of the flanges 27 to accommodate a pivot pin 28. Alternatively, a short tubular member or bearing can be welded to the free end of each flange 27 to accommodate the pivot pin 28.

A pivot arm assembly 29 couples the cutting assembly 11 to the frame assembly 18. The pivot arm assembly 29 includes a pair of parallel side members 30, 31 secured together in a spaced apart relationship by a plate member 32 extending therebetween. The side members 30, 31 are each formed of a shaft member having a first end 33 pivotally connected to the pivot pin 28 at the offset mounting location 23 of the second tubular member 22 for rotation about an axis transverse to the tractor's direction of travel.

A motor mount 34 is secured between the distal ends 35 of the side members 30, 31 for providing a mounting surface 36 for the motor 13. The motor mount 34 has a U-shaped cross section with downwardly extending side portions 37 and a flat connecting portion 38 extending between the upper edges of the side portions 37. The flat connecting portion 38 provides the mounting surface 36. The distal ends 35 of the side members 30, 31 of the arm assembly 29 are welded to the side portions 37 of the motor mount 34. The mounting surface 36 of the motor mount 34 is in a generally horizontal plane, or tapered slightly downwardly and forwardly, when the pivot arm assembly 29 is pivoted to its lowered position. In the lowered position, the parallel side members 30, 31 extend at an angle downwardly and forwardly from the second tubular member 22 to the motor mount 34.

Figure 5:
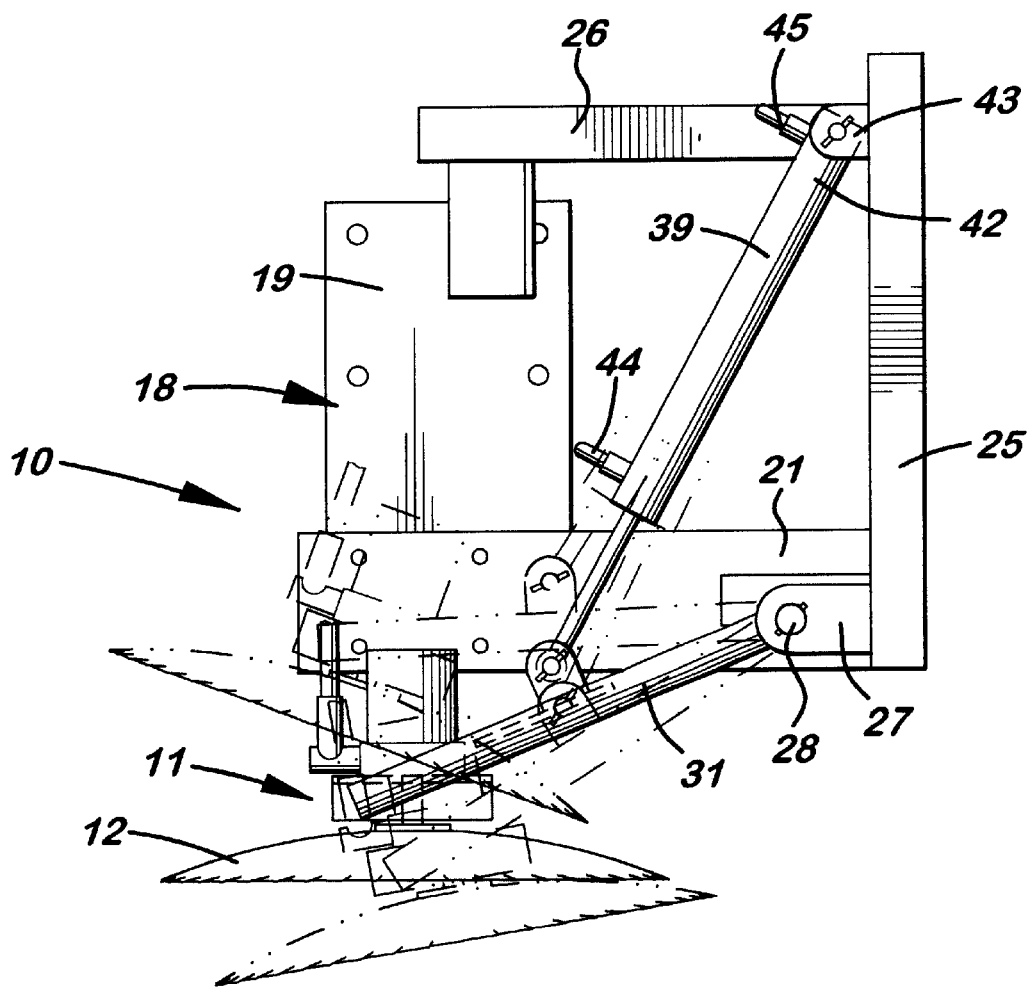
FIG. 5 is a side view of the rotary tree cutting device showing various raised and lowered positions of the cutting blade.

A hydraulic actuator 39 has one end 40 coupled to a pair of flanges 41 welded to the plate member 32 of the pivot arm assembly 29, and another end 42 coupled to a pair of flanges 43 welded to the third tubular member 24 of the frame assembly 18. The hydraulic actuator 39 is connected by a pair of hydraulic lines 44, 45 to the hydraulic system of the tractor 17 for two-way operation. The hydraulic actuator 39 is operable to move the pivot arm assembly 29 between a lowered position in which the cutting edge 14 of the circular blade 12 is generally horizontal and at ground level for cutting, and a raised position in which the cutting edge 14 of the circular blade 12 is elevated above ground level for traveling. Alternatively, the circular blade 12 can be angled slightly downwardly and forwardly in the lowered position with the cutting edge 14 at ground level only at the front of its path of rotation. These positions are shown in FIG. 5 of the drawings.

The tractor 17 on which the tree cutter device 10 is attached has a pair of front wheels 46 and a pair of rear wheels 47. The second tubular frame 22 of the frame assembly 18 extends between the front and rear wheels 46, 47 on one side of the tractor 17 to the offset mounting location 23. When the cutting assembly 11 is coupled to the frame assembly 18 at the offset mounting location 23, the circular blade 12 is disposed slightly behind and offset outwardly of the front wheel 46 on the one side of the tractor 17. This mounting position makes the cutting blade 12 highly visible to an operator of the tractor 17 and also allows the tractor 17 to continue its forward movement after each tree is cut without driving over the felled trees.

In operation, the tractor 17 with the attached tree cutter device 10 is driven to a position in which the tree to be cut is beside the front-wheel 46 of the tractor 17. The hydraulic actuator 39 is then extended using a control lever on the tractor 17 to move the cutting assembly 11 to its lowered position with the circular blade 12 at ground level.

The hydraulic motor 13 is then activated using another control lever on the tractor 17 to rotatably drive the circular blade 12. The tractor 17 is then driven forwardly moving the blade 12 into the tree until the serrated edge 14 of the blade 12 engages and then cuts through the tree trunk. In the case of a small tree, the blade 12 will cut through the tree quickly with only a fraction of a rotation of the hydraulic motor 13. In the case of a large tree, several rotations of the motor 13 may be required. Also, where several trees to be cut are located close together, the hydraulic motor 13 may be operated continuously as the tractor 17 moves the tree cutter device 10 from one tree to another.

In a variation of the present invention, the hydraulic control for the hydraulic actuator 39 and the hydraulic motor 13 may be interconnected so that a single lever can be used by the tractor operator to lower the pivot arm assembly 29 and start the motor 13 for rotatably driving the circular blade 12. In this case, the operator need only move the single lever to activate the tree cutting device 10 when the tractor 17 approaches each tree.

It will be appreciated that certain features of the present invention described above can be changed without departing from the scope of the invention. For example, a sprayer attachment can be added to the tree cutter device 10 to spray the stumps of cut trees to prevent regrowth of the trees. Also, the tree cutter device 10 can be attached to mobile vehicles other than tractors, such as automobiles, ATVs, bull dozers, and the like. Also, the hydraulic actuator 39 for raising and lowering the pivot arm assembly can be a single-acting cylinder with a spring to return the pivot arm assembly 29 to its raised position. Safety equipment, such as shields and bars, may be added as necessary to prevent an operator from being harmed by the rotating cutting blade or other moving components of the invention.

While the invention has been specifically described in connection with specific embodiments thereof, it is to be understood that this is by way of illustration and not of limitation, and the scope of the appended claims should be construed as broadly as the prior art will permit.

What is claimed is:

1. In combination a mobile vehicle having a rotary tree cutter device mounted thereto for cutting tree, the rotary tree cutter device comprising:

a cutting assembly having a circular blade with a serrated outer edge for cutting, and a motor connected to said blade for rotatably driving said blade;

a frame assembly mounted to a frame of the mobile vehicle, the frame assembly comprising a first portion rigidly attached to the vehicle frame, and a second portion extending generally perpendicular to said first portion and fixed rigidly to said first portion, said second portion providing an offset mounting location outside of a wheel path of the mobile vehicle; and a pivot arm having a first end pivotally connected to the offset mounting location of the frame assembly for rotation about an axis transverse to the mobile vehicle's direction of travel, said pivot arm being movable relative to said frame assembly only about said transverse axis, and a second end supporting said cutting assembly, said pivot arm being movable about said axis between a lowered position in which at least a portion of the cutting edge of the circular blade is at ground level for cutting, and a raised position in which the cutting edge of the circular blade is elevated above ground level for traveling;

further comprising a hydraulic actuator connected between the pivot arm and said second portion of the frame assembly for moving said pivot arm between said lowered and raised positions;

said pivot arm comprising a pair of parallel side members secured together in a spaced apart relationship by a plate member extending therebetween the hydraulic actuator connected between the plate member and said second portion of the frame assembly for moving said pivot arm between said lowered and raised positions, said pivot arm further comprising a motor mount secured between the distal ends of the side members for providing a mounting surface for said motor;

wherein said vehicle is a tractor having a pair of front wheels and a pair of back wheels, said second portion of the frame assembly extends between the front and rear wheels on one side of the tractor to said offset mounting location, and said cutting assembly is disposed slightly behind and offset outwardly of the front wheel on said one side of the tractor, whereby the cutting blade is highly visible by an operator of the tractor, and the tractor can continue its forward movement after each tree is cut without driving over the felled trees.

2. The combination according to claim 1, wherein said first portion of the frame assembly comprises a first tubular member, and said second portion of the frame assembly comprises a second tubular member, said first and second tubular members together forming an L-shape.

3. The combination according to claim 2, wherein said second portion of the frame assembly comprises a third tubular frame member extending vertically upward from said second tubular frame member, said third tubular frame member providing a mounting location for one end of the hydraulic actuator used to move the pivot arm between said lowered and raised positions.

4. The combination according to claim 2, wherein said frame assembly further comprises at least one cross brace extending between said first and second portions to strengthen the frame assembly.

5. The combination according to claim 1, wherein said motor for driving the blade is a hydraulic motor.

6. The combination according to claim 1, wherein said circular blade has a concave side facing downwardly to accommodate a mounting structure between the motor and the blade and to facilitate tree cutting at or below the ground surface.

7. The rotary tree cutter device according to claim 1, wherein said circular blade is a modified disk blade from an earthworking implement, and wherein said serrated outer edge is formed by making shallow cuts in an outer periphery of the disk blade.

8. The rotary tree cutter device according to claim 1, wherein said motor mount has a U-shaped cross section with downwardly extending side portions and a flat connecting portion extending between the upper edges of the side portions and providing said mounting surface, and said parallel side members of the pivot arm assembly are each formed of a shaft member having one end pivotally connected to a pivot shaft attached to the second tubular member and another end welded to the side portions of the motor mount, said mounting surface of said motor mount being in a generally horizontal plane when said pivot arm assembly is pivoted to its lowered position in which the parallel side members extend at an angle downwardly and forwardly from the second tubular member to the motor mount.

* * * * *